(12) United States Patent
Drake, II et al.

(10) Patent No.: US 10,440,018 B2
(45) Date of Patent: Oct. 8, 2019

(54) AUTHENTICATION WORKFLOW MANAGEMENT

(71) Applicant: AT&T Intellectual Property I, L.P., Atlanta, GA (US)

(72) Inventors: Alton Drake, II, Atlantic Highlands, NJ (US); Brian M. Novack, St. Louis, MO (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 194 days.

(21) Appl. No.: 15/483,333

(22) Filed: Apr. 10, 2017

(65) Prior Publication Data
US 2018/0295128 A1  Oct. 11, 2018

(51) Int. Cl.
*H04L 29/06* (2006.01)
*G06K 9/00* (2006.01)

(52) U.S. Cl.
CPC ...... *H04L 63/0861* (2013.01); *G06K 9/00892* (2013.01); *H04L 63/083* (2013.01); *H04L 63/105* (2013.01); *H04L 2463/082* (2013.01)

(58) Field of Classification Search
CPC . H04L 3/0861; H04L 3/08; H04L 3/10; H04L 3/105; H04L 3/083; H04L 9/32; H04L 9/3271; H04L 9/3226–3234; G06K 9/08892
See application file for complete search history.

(56) References Cited

U.S. PATENT DOCUMENTS

| | | | |
|---|---|---|---|
| 7,231,657 B2 | 6/2007 | Honarvar et al. | |
| 7,403,765 B2 * | 7/2008 | Miyashita | H04M 1/67 455/410 |
| 8,862,526 B2 | 10/2014 | Miltonberger | |
| 9,021,565 B2 | 4/2015 | Novack et al. | |
| 9,210,156 B1 | 12/2015 | Little et al. | |
| 9,219,723 B1 | 12/2015 | Potash et al. | |
| 9,275,211 B2 | 3/2016 | Stubblefield | |
| 9,294,448 B2 | 3/2016 | Miller et al. | |
| 9,355,231 B2 | 5/2016 | Disraeli | |
| 9,369,457 B2 | 6/2016 | Grajek et al. | |
| 9,391,986 B2 | 7/2016 | Schultz et al. | |
| 2009/0270072 A1 * | 10/2009 | Hsu | H04L 63/083 455/411 |
| 2009/0327000 A1 | 12/2009 | Davis et al. | |

(Continued)

*Primary Examiner* — Khalil Naghdali
*Assistant Examiner* — Shaqueal D Wade
(74) *Attorney, Agent, or Firm* — Baker Botts, LLP

(57) ABSTRACT

According to one embodiment, an authentication tool includes a memory, an interface, and a processor. The memory stores a workflow to authenticate a user to access an application. The workflow includes a first control frame for a first authentication type and a second control frame for a second authentication type. The authentication types are different and include one of a device identification, a biometric identification, a personal identification number (PIN) identification, and a security question identification. The interface receives a request to access the application and receives a first input and a second input. The processor determines a first numerical score in response to the first input and a second numerical score in response to the second input. The processor allows the user to access the application upon a determination that the scores exceed a predetermined threshold.

20 Claims, 3 Drawing Sheets

(56) References Cited

U.S. PATENT DOCUMENTS

| | | | |
|---|---|---|---|
| 2011/0225426 A1* | 9/2011 | Agarwal | G06F 21/41 |
| | | | 713/175 |
| 2015/0089585 A1* | 3/2015 | Novack | H04L 63/08 |
| | | | 726/3 |
| 2015/0326601 A1 | 11/2015 | Grondin et al. | |
| 2018/0012227 A1* | 1/2018 | Tunnell | G06Q 20/40145 |
| 2018/0268414 A1* | 9/2018 | Chung | G06Q 20/40145 |

* cited by examiner

150
AUTHENTICATION WORKFLOW MANAGEMENT

TECHNICAL FIELD

The present disclosure relates generally to authentication and more particularly to authentication workflow management.

BACKGROUND

Users may access applications. Users may be required to authenticate their identity before accessing the applications. For example, users may authenticate their identity using a password, biometric data, one time codes, and/or any other suitable mechanism. Some applications may require higher security measures than other applications. Users may be required to provide additional and/or more secure identifying information to access applications that require higher security measures.

SUMMARY

In one embodiment, an authentication tool includes a memory, an interface, and a processor. The memory stores a workflow to authenticate a user to access an application. The workflow includes a first control frame for a first authentication type and a second control frame for a second authentication type. The authentication types are different and include one of a device identification, a biometric identification, a personal identification number (PIN) identification, and a security question identification. The interface receives a request to access the application and receives a first input and a second input. The processor determines a first numerical score in response to the first input and a second numerical score in response to the second input. The processor allows the user to access the application upon a determination that the scores exceed a predetermined threshold.

In another embodiment, a method includes: storing a workflow to authenticate a user to access an application, wherein the workflow comprises a first control frame for a first authentication type and a second control frame for a second authentication type, the first and second authentication types being different and comprising one of a device identification, a biometric identification, a personal identification number (PIN) identification, and a security question identification; receiving a request to access the application; initiating the workflow in response to the request to access the application; receiving a first input of the first authentication type for the first control frame and a second input of the second authentication type for the second control frame; determining a first numerical score in response to the first input and a second numerical score in response to the second input, the first numerical score determined according to a risk level of the first input and the second numerical score determined according to a risk level of the second input; determining an aggregate score using at least the first and second numerical scores; and allowing access to the application upon a determination that the aggregate score exceeds a predetermined threshold.

The present disclosure presents several technical advantages. In some embodiments, an authentication tool determines an appropriate authentication workflow for an application. For example, applications that include confidential information or otherwise require higher security measures may be assigned an authentication workflow that requires a relatively high authentication procedure. Providing dynamic authentication requirements provides the technical advantage of increasing computer and network security. In some embodiments, an authentication tool may determine authentication capabilities of a user device to determine an authentication procedure to access an application, thus increasing computer and network security by properly utilizing a user device's authentication capabilities.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

To assist in understanding the present disclosure, reference is now made to the following brief description, taken in connection with the accompanying drawings, in which.

DETAILED DESCRIPTION

Providing dynamic and customizable security access requirements to applications presents several technical challenges. Users may be required to authenticate their identity before receiving access to an application. Particular methods of authentication are more secure than other types of authentication. For example, fingerprint authentication may be more secure than personal identification number identification. Furthermore, particular applications require higher security access requirements than other types of applications. Additionally, different user devices provide different capabilities for providing authentication information for a user. For example, some user devices may include one or more types of biometric scanners to authenticate a user. Traditional systems may not allow customization of security access requirements for applications based on the security needs of the application. Furthermore, traditional systems may not dynamically revise security requirements based on capabilities of consumer devices. Thus, traditional systems may not adequately secure applications by ensuring that applications are associated with a correct level of security access requirements.

This disclosure contemplates providing customizable and dynamically updated authentication workflows to access applications. For example, an administrator may indicate a security requirement for an application and an authentication tool may automatically generate an authentication workflow for the application based on the security requirements of the application. When a user attempts to access the application using a user device, the authentication tool may dynamically update the authentication workflow based on the capabilities of the user device. Furthermore, the authentication workflow allows customization of access requirements for applications by integrating one or more authentication types and making access decisions based on input received for the one or more authentication types.

Figure 1:
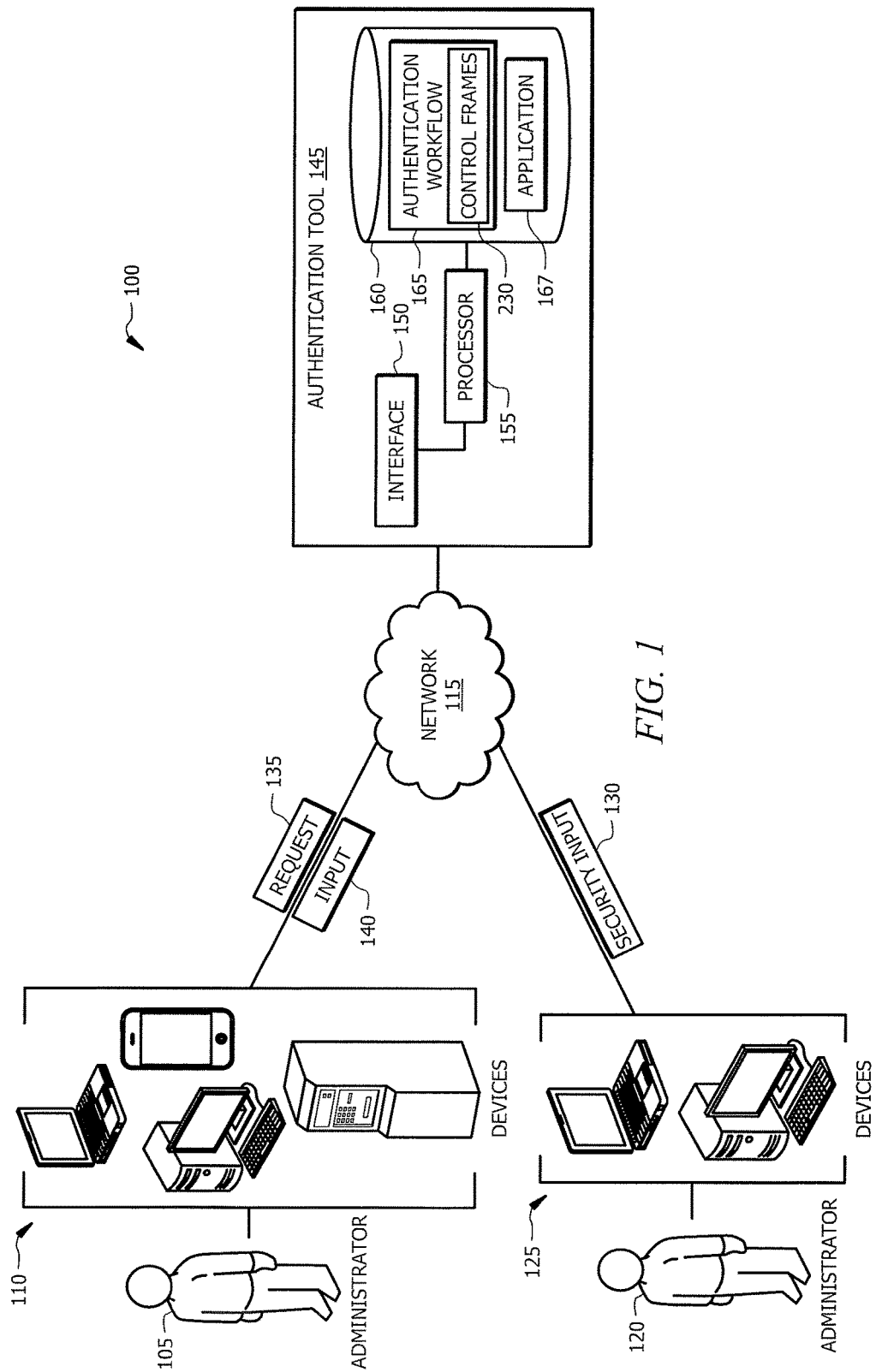
FIG. 1 illustrates a system for authentication workflow management, in certain embodiments.

FIG. 1 illustrates a system 100 configured to perform an authentication workflow. Generally, system 100 generates authentication workflow 165, authenticates user 105 using authentication workflow 165, and provides access to application 167. As illustrated in FIG. 1, system 100 includes user 105, user device 110, administrator 120, administrator device 125, and authentication tool 125, communicatively coupled by network 115. Administrator 120 may create authentication workflow 165 using administrator device 125 and/or authentication tool 145. Authentication tool 145 may provide user 105 access to application 167.

Using administrator device 125, administrator 120 communicates security input 130 to authentication tool 145. Security input 130 may be communicated to generate authentication workflow 165. For example, administrator 120 may be an administrator for one or more applications 167 associated with authentication tool 145. Administrator 120 may indicate security requirements for accessing application 167 within security input 130. Administrator 120 may be associated with an enterprise and/or a unit within an enterprise. For example, administrator 120 may be in a security unit in an enterprise. This disclosure contemplates administrator 120 being any suitable individual that provides security input 130 to authentication tool 145 using administrator device 125.

Administrator device 125 may be any device that administrator 120 uses to operate and/or communicate with other components of system 100. System 100 may include one administrator device 125 or any number of administrator devices 125. In general, administrator device 125 communicates security input 130 to authentication tool 145.

This disclosure contemplates administrator device 125 being any appropriate device for sending and receiving communications over network 115. As an example and not by way of limitation, administrator device 125 may be a computer, a laptop, a wireless or cellular telephone, an electronic notebook, a personal digital assistant, a tablet, or any other device capable of receiving, processing, storing, and/or communicating information with other components of system 100. Administrator device 125 may also include a user interface, such as a display, a microphone, keypad, or other appropriate terminal equipment usable by administrator 125. In some embodiments, an application executed by administrator device 125 may perform the functions described herein.

In some embodiments, administrator 120 communicates security input 130 to authentication tool 145 using administrator device 125. Security input 130 generally indicates security requirements to access application 167. Security input 130 may include an application type for application 167. For example, security input 130 may indicate that application 167 is a social media application, a financial application, a travel, a news application, and/or any other suitable type of application. As another example, in some embodiments, application 167 may be an application type that includes confidential information that requires increased security measures. Authentication tool 145 may determine authentication workflow 165 based on the application type. In some embodiments, security input 130 may indicate a security level of application 167. For example, security input 130 may indicate that application 167 is low risk, guarded risk, elevated risk, high risk, or any other suitable type of risk. Thus, security input 130 may specify any type of risk in a hierarchal list of risk categories. In some embodiments, authentication tool 145 may generate authentication workflow 165 based on a risk identified in by security input 130. In some embodiments, security input 130 may include a risk score. For example, a higher risk score may indicate a relatively higher authentication requirement. Authentication tool 145 may generate authentication workflow 165 based, in part, on the risk score, in some embodiments.

User 105 is generally a user of system 100. System 100 may include a single user 105 or any number of users 105. User 105 generally utilizes system 100 to access application 167. For example, user 105 may provide authentication input 140 to authentication tool 145 utilizing user device 110 to access application 167. This disclosure contemplates user 105 using system 100 to provide any type of input 140 to access any type of application 167.

User device 110 may be any device that user 105 utilizes to operate and/or communicate with other components of system 100. System 100 may include one user device 110 or any number of user devices 110. In general, user device 110 communicates request 135 to access application 167 and provides input 140 to verify user 105's identity.

User device 110 may include any appropriate device for sending and receiving communications over network 115. As an example and not by way of limitation, user device 110 may be a computer, a laptop, a wireless or cellular telephone, an electronic notebook, a personal digital assistant, a tablet, a kiosk, an automated teller machine (ATM), or any other device capable of receiving, processing, storing, and/or communicating information with other components of system 100. User device 110 may also include a user interface, such as a display, a microphone, keypad, or other appropriate terminal equipment to be used by user 105. In some embodiments, user device 110 may include one or more biometric scanners. Examples of biometric scanners include, but are not limited to, retina scanners, finger print scanners, heart rate monitors, voice print scanners, cameras, fragrance detectors, facial recognition devices, gesture recognition cameras, height determination devices, and walking gait authentication devices A biometric scanner may be any device configured to capture information about a person's physical characteristics. In some embodiments, an application executed by user device 110 may perform the functions described herein.

In some embodiments, user 105 communicates request 135 to authentication tool 145 utilizing user device 110. Request 135 is generally a request to access application 167. For example, user 105 may navigate to a website landing page using user device 110 to request access to application 167. User 105 may request access to application 167 in any suitable manner. Generally, authentication tool 145 initiates authentication workflow 165 in response to request 135. Request 135 may identify application 167, in some embodiments. Request 135 may include information to identify user 105 and/or user device 110. This disclosure contemplates request 135 including any suitable information to request access to application 167.

Authentication tool 145 may receive input 140 to verify user 105. Input 140 may include one or more human factors, environmental factors, network factors, and/or machine factors, in some embodiments. Human factors may include username and password combinations, passwords, one-time codes, personal identification numbers (PIN), and/or biometric information. Environmental factors may include global positioning system ("GPS") information and/or elevation information. Network factors may include internet protocol ("IP") addresses. Machine factors may include device identifications, device types, and/or device versions. In some embodiments, user 105 communicates all of part of input 140 to authentication tool 145 using user device 110. In some embodiments, user device 110 may generate input 140. For example, when input 140 includes biometric information for user 105, user device 110 may use a biometric scanner to generate the biometric information. As another example, user device 110 may communicate all or part of input 140 to authentication tool 145 without input from user 105. This disclosure contemplates input 140 including any suitable information for identifying user 105's identity.

Network 115 facilitates communication between and amongst the various components of system 100. This disclosure contemplates network 115 being any suitable network operable to facilitate communication between the components of system 100. Network 115 may include any interconnecting system capable of transmitting audio, video, signals, data, messages, or any combination of the preceding. Network 115 may include all or a portion of an ad hoc network, an intranet, an extranet, a virtual private network ("VPN"), LAN, a wireless LAN ("WLAN"), a WAN, a wireless WAN ("WWAN"), a metropolitan area network ("MAN"), a portion of the Internet, a portion of the Public Switched Telephone Network ("PSTN"), a cellular telephone network, including combinations thereof, operable to facilitate communication between the components. Network 115 may include one or more wireline (such as, for example, Digital Subscriber Line ("DSL") or Data Over Cable Service Interface Specification ("DOCSIS")), wireless (such as, for example, 2G, 3G, 4G, or 5G cellular, Wi-Fi, or Worldwide Interoperability for Microwave Access ("WiMAX")), or optical (such as, for example, Synchronous Optical Network ("SONET") or Synchronous Digital Hierarchy ("SDH")) links, including combinations thereof.

Authentication tool 145 generally generates authentication workflow 165 and uses authentication workflow 165 to determine whether to allow user 105 to access application 167. Administrator 120 may provide create workflow 165 using administrator device 125 and/or authentication tool 145. For example, administrator 120 may provide security input to 130, and authentication tool 145 may utilize security input 130 to generate authentication workflow 165. Authentication tool 145 may initiate authentication workflow 165 in response to request 135 from user device 110. Authentication tool 145 may receive input 140 and use input 140 to determine whether to grant user 105 access to application 167. In the illustrated embodiments, authentication tool 145 includes interface 150, processor 155, and memory 160. System 100 may include one authentication tool 145 or any suitable number of authentication tools 145. For example, in the embodiments, where system 100 includes a plurality of applications 167, system 100 may include one authentication tool 145 for each application. In other embodiments, more than one application 167 may be associated with a single authentication tool 145.

Interface 150 represents any suitable device operable to receive information from network 115, transmit information through network 115, perform suitable processing of the information, communicate with components of system 100 and/or other devices, or any combination of the preceding. For example, interface 150 may transmit information to any device of system 100. As another example, interface 150 may receive request 135 and/or input 140 from user device 110. As yet another example, interface 150 may receive security input 130 from administrator device 125. Interface 150 represents any port or connection, real or virtual, including any suitable hardware and/or software, including protocol conversion and data processing capabilities, to communicate through a LAN, WAN, or other communication systems that allow authentication tool 145 to communicate with other components of system 100 directly or via network 115. Interface 150 is not limited to a single interface and may encompass multiple interfaces.

Processor 155 represents any electronic circuitry, including, but not limited to, microprocessors, application specific integrated circuits (ASIC), application specific instruction set processor (ASIP), and/or state machines, that communicatively couples to memory 160 and interface 150 and controls the operation of authentication tool 145. Processor 155 may be 8-bit, 16-bit, 32-bit, 64-bit or of any other suitable architecture. Processor 155 may include an arithmetic logic unit (ALU) for performing arithmetic and logic operations, processor registers that supply operands to the ALU and store the results of ALU operations, and a control unit that fetches instructions from memory 160 and executes them by directing the coordinated operations of the ALU, registers and other components. Processor 155 may include other hardware and software that operates to control and process information. Processor 155 executes software stored on memory 160 to perform any of the functions described herein. Processor 155 controls the operation and administration of the device by processing information received from network 115 and/or any suitable component of system 100. Processor 155 may be a programmable logic device, a microcontroller, a microprocessor, any suitable processing device, or any suitable combination of the preceding. Processor 155 is not limited to a single processing device and may encompass multiple processing devices.

Memory 160 may store, either permanently or temporarily, data, operational software, or other information for processor 155. Memory 160 may be a computer-readable non-transitory storage medium, in some embodiments. Memory 160 may include any one or a combination of volatile or non-volatile local or remote devices suitable for storing information. For example, memory 160 may include random access memory (RAM), read only memory (ROM), magnetic storage devices, optical storage devices, or any other suitable information storage device or a combination of these devices. Memory 160 may include software. The software may be any suitable set of instructions, logic, or code embodied in a computer-readable storage medium. For example, the software may include rules to facilitate performing any of the functions of authentication tool 145. The software may be embodied in memory 160, a disk, a CD, or a flash drive. In particular embodiments, the software may include an application executable by processor 155 to perform one or more of the functions described herein. In some embodiments, the software may include authentication workflow 165 and/or application 167.

In the illustrated embodiments, memory 160 includes application 167. Application 167 is generally a computer application. Application 167 may provide information to user 105 and/or receive information from user 105. For example, application 167 may be a social media application, a financial application, a travel application, a news application, and/or any other suitable type of application. This disclosure contemplates application 167 being any suitable type of application that provides information to and/or receives information from user 105. Although illustrated as included in memory 160, application 167 may be stored remote to memory 160. For example, application 167 may be stored in user device 110 and/or any other suitable component of system 100.

Authentication tool 145 generally uses authentication workflow 165 to determine whether to allow user 105 to access application 167. Authentication tool 145 may generate authentication workflow 165 based on security requirements for application 167. Generally, authentication workflow 165 includes one or more control frames 230. Control frame 230 generally accepts input 140 and determines whether input 140 is acceptable. For example, control frame 203 may accept a password and determine whether the password is acceptable. As another example, control frame 230 may accept a biometric input and determine whether the biometric input is within a predetermined threshold. In some embodiments, each control frame 230 generates a score. In these embodiments, authentication tool 145 may provide user 105 access to application 167 if one or more control frames 230 generate a score that is greater than a predetermined threshold. In some embodiments, authentication tool 145 receives input 140 for a first control frame 230 and determines whether to proceed to an additional control frame 230 based on input 140. In some embodiments, authentication workflow 165 may be dynamically revised based on request 135. For example, in embodiments where request 135 identifies user device 110, authentication tool 145 may revise authentication workflow 165 based on the capabilities of user device 110. Authentication tool 145 and control frames 230 are discussed in more detail in the disclosure with respect to FIG. 2.

In an exemplary embodiment of operation, administrator 120 generates security input 130 using administrator device 125. As discussed, security input 130 may indicate security access requirements for application 167. Thus, if application 167 includes secure information, security input 130 may indicate that application 167 should have relatively stringent access procedures. On the other hand, if application 167 provides no confidential or secure information to user 105, user 105 may relatively easily gain access to application 167 with less stringent access requirements.

Authentication tool 145 receives security input 130 and generates authentication workflow 165 based on security input 130. For example, authentication tool 145 may determine one or more control frames 230 to include in authentication tool 145 based on security input 130. For example, authentication tool 145 may determine a risk associated with application 167. Authentication tool 145 may generate authentication workflow 165 using a template for the risk identified in security input 130. As discussed, authentication workflow 165 may generate a score. Authentication tool 145 may determine a minimum score required to access application 167. Specific components of authentication workflow 165 are discussed in more detail in relation to FIG. 2.

User 105 generates request 135 to access application 167 using user device 110 and communicates request 135 to authentication tool 145. Authentication tool 145 receives request 135 to access application 167 and determines authentication workflow 165 associated with application 167. In some embodiments, request 135 may identify user 105 and/or user device 110. Authentication tool 145 may revise authentication workflow 165 based on request 135. For example, authentication tool 145 may determine, using request 135, that user device 110 has and/or lacks particular capabilities. For example, user device 110 may include a camera capable to perform facial recognition. Authentication tool 145 may revise authentication workflow 165 based on capabilities of user device 110. For example, authentication tool 145 may include a control frame 230 that requests facial recognition information as input 140. As another example, authentication tool 145 may determine that user 105 has recently requested access to one or more applications 167 in an unexpected way. In these embodiments, authentication tool 145 may revise authentication workflow 165 to make access to application 167 more difficult. For example, authentication tool 145 may increase a score required to access application 167.

Authentication tool 145 requests input 140 from user 105, and user 105 provides input 140 using user device 110. Authentication tool 145 requests input 140 based on one or more control frames 230 in authentication workflow 165. For example, if control frame 230 requires a password, authentication tool 145 may request a password from user 105 and user 105 may include a password in input 140. Authentication tool 145 may request input 140 for one control frame 230 at a time or input 140 for multiple frames 230. In some embodiments, authentication tool 145 may not determine a second control frame 230 until after authentication tool 145 receives input 140 for a prior control frame 230.

Authentication tool 145 generates a score for each control frame 230 in authentication tool 145 and aggregates the score for each control frame 230. In some embodiments, authentication tool 145 determines whether the aggregate score exceeds a predetermined threshold. If the aggregate score does exceed a predetermined threshold, authentication tool 145 provides user 105 access to application 167. Otherwise, authentication tool 145 may deny user 105 access to application 167. In some embodiments, authentication tool 145 may not determine a score. For example, authentication tool 145 may provide access upon successful completion of control frame 230. For example, authentication tool 145 may request a password and allow access upon receiving the password. In some embodiments, user 105 may fail a first control frame 230 (e.g., user fails voice recognition control frame) and authentication tool 145 may request input 140 for a second control frame 230 before determining whether to allow or deny user 105 access to application 167. Thus, authentication tool 145 may dynamically determine which control frame 230 to request input 140 from user 105 as user 105 traverses authentication workflow 165.

Modifications, additions, or omissions may be made to system 100 without departing from the scope of the disclosure. For example, system 100 may include any number of authentication tools 145, user devices 110, and/or administrator devices 125. As another example, system may include some, none, or all of the components illustrated in FIG. 2.

Figure 2:
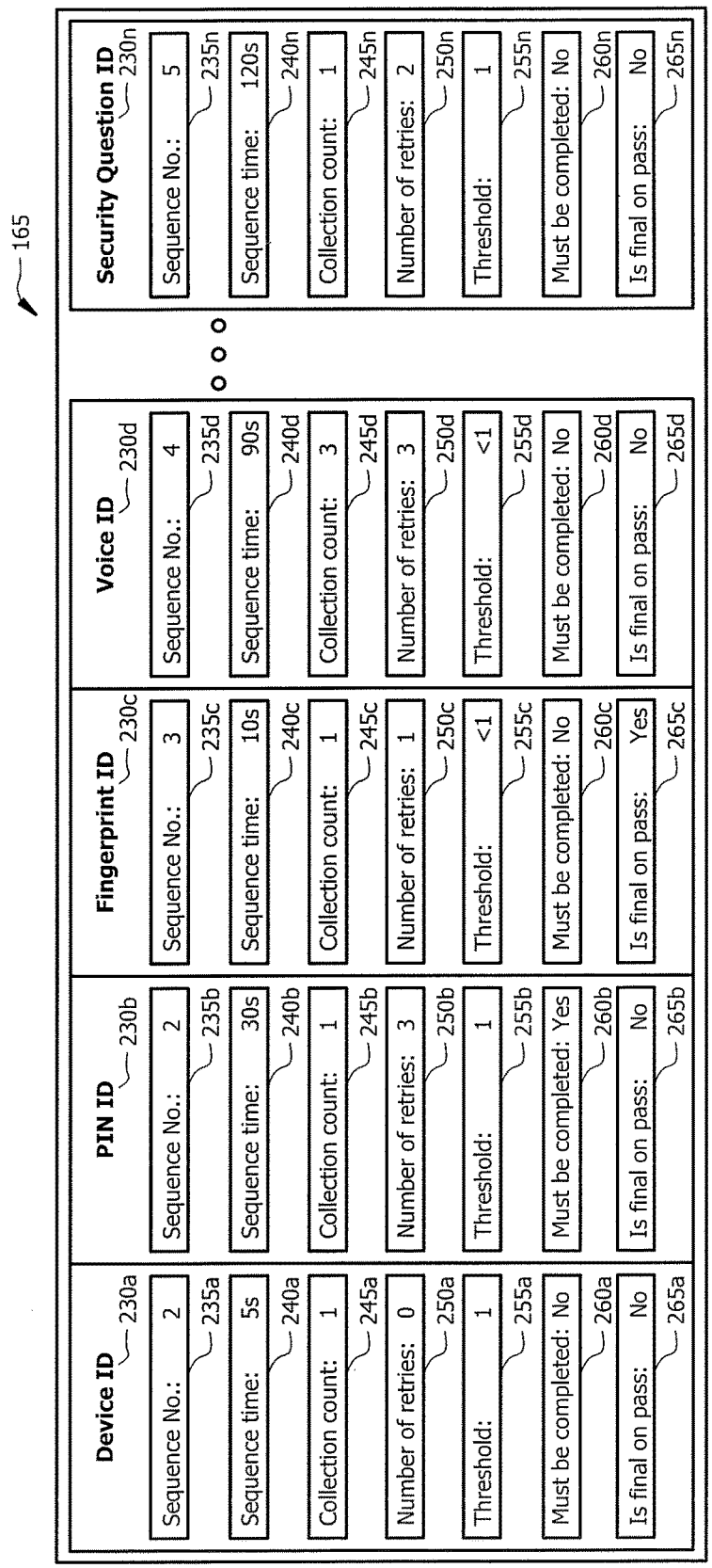
FIG. 2 illustrates representative authentication workflow control frames, in certain embodiments.

FIG. 2 illustrates a representation of authenticating workflow 165 of FIG. 1, in certain embodiments. As discussed, authentication tool 145 may use security input 130 to generate authentication workflow 165 and may use authentication workflow 165 to determine whether to allow user 105 to access application 167. Authentication workflow 165 increases computer and network security by allowing access to application 167 based on security requirements for application 167.

In the illustrated embodiment, authentication workflow 165 includes control frames 230. For example, authentication workflow 165 may include a device identification control frame 230a, a PIN identification control frame 230b, a fingerprint identification control frame 230c, a voice identification control frame 230d, a security question identification control frame 230n, and/or any other suitable type of control frame. Authentication workflow 165 may include a single control frame 230 or any number of control frames 230. Generally, control frame 230 accepts input 140 and determines whether input 140 meets certain thresholds. For example, device identification control frame 230a may determine user device 110 using request 135 and/or input 140. If user device 110 is a recognized device associated with user 105, authentication tool 145 may assign a predetermined number of points for device identification control frame 230. In some embodiments, authentication tool 145 may require that user 105 pass device identification control frame 230a to be granted access to application 167. While illustrated as being a particular order, authentication workflow 165 may include control frames 230 in any suitable order. Authentication workflow 165 may include some, none, or all of the illustrated control frames 230. Authentication workflow 165 may include additional control frames 230, in some embodiments.

In the illustrated embodiments, each control frame 230 includes "sequence number" field 235, "sequence time" field 240, "collection count" field 245, "number of retries" field 250, "threshold" field 255, "must be completed" field 260, and "is final on pass" field 265. One or more control frames 230 may include some, none, or all of the illustrated fields. One or more control frames 230 may include additional fields, in some embodiments. Generally, the fields supply thresholds for input 140 and facilitate determining whether to allow user 105 access to application 167.

Sequence number field 135 generally indicates an order that control frames 230 are presented within authentication workflow 165. For example, authentication tool 145 may determine a first control frame 230 in a sequence and request input 140 from user 105 for the first control frame 230. Sequence 235 may be predetermined when authentication tool 145 generates authentication workflow 165. In some embodiments, sequence 235 may be dynamically revised as authentication tool 145 receives request 135 and/or input 140.

Sequence time field 240 indicates a time period threshold for user 105 and/or user device 110 to provide input 140. For example, in control frame 230b, authentication tool 145 may require a PIN input. In the illustrated embodiment, user 105 may have thirty seconds to provide the PIN. If user 105 and/or user device 110 do not provide input 140 within the predetermined time specified by sequence time field 240, user 105 may fail control frame 230. In some embodiments, user 105 may receive a reduced score for control frame 230 if user 105 and/or user device 110 fails to provide request 140 within the time indicated by sequence time field 240.

Collection count field 245 generally indicates a number of inputs 140 to receive for control frame 230. In some embodiments, authentication tool 145 may request binary input 140. The binary input 140 may be correct or incorrect. For example, a password, a security question, or a PIN may be a binary input. In these embodiments, collection count field 245 may be one. A collection count field 245 of one indicates only one response for that input 140 will be accepted. However, in some embodiments, input 140 may include biometric information. For example, input 140 may include fingerprint information, voice information, walking gait information or any other suitable amount of information. Collection count field 245 may include a number of times to collect biometric information and/or an amount of time in which to collect the biometric information. For example, authentication tool 145 may require input 140 to include three seconds of voice information for voice identification control frame 230d. In some embodiments, collection count field 245 may indicate a sample count. As another example, authentication tool 145 may require two fingerprint samples for fingerprint identification control frame 230c when collection count field 245 is set to two.

One or more control frames 230 may include a number of retries field 250. Number of retries field 250 indicate a number of times user 105 and/or device 110 may communicate input 140 upon failure of control frame 230. For example, PIN identification control field 230b may include a number of retries field 250b that indicates three retries. That is, if user 105 enters a wrong PIN to include as input 140, user 105 may reenter the PIN three additional times before failing control frame 230b. In some embodiments, user 105 may fail control frame 230 if user 105 exceeds the number of retries indicated by number of retries field 250 without providing sufficient input 140. In some embodiments, a score for control frame 230 may decrease with each retry or may decrease once the number indicated by number of retries field 250 is reached.

Control frames 230 may include threshold field 255, in some embodiments. Authentication tool 145 may determine the likelihood that input 140 is associated with user 105. For example, when input 140 is a fingerprint input, authentication tool 145 may determine that the input 140 is an 85% match to a fingerprint input stored for user 105. Threshold field 255 may indicate how close input 140 must be to an expected input to be considered successful. In the illustrated embodiment, device identification control frame 230a has a threshold field 255a of "1." A threshold field 255 of "1" may indicate that input 140 must successfully match an expected 100% to be successful. With biometric inputs and/or any other type of input, threshold field 255 may be less than "1." For example, for fingerprint identification control frame 230c, threshold field 255 may be "0.8." This may indicate that a received fingerprint in input 140 must confirm at least 80% with an expected fingerprint to be successful. While described as having a lower threshold, threshold field 255 may comprise an upper threshold field, in some embodiments. For example, if input 140 is voice input, the input may fail control frame 230 when the voice input matches 100% of the expected input. For example, authentication tool 145 may determine that it is statistically unlikely that user 105 may recreate voice input more than 95% accurately. Thus, a voice input that matches greater than 95% of the expected input may fail control frame 230. Threshold field 255 may indicate any suitable number and is not limited to percentages.

Must be completed field 260 indicates whether control frame 230 must be successfully completed to allow user 105 to access application 167. For example, user 105 may fail a first control frame 135. If must be completed field 260 indicates that control frame 230 must be completed (e.g., by indicating "yes"), user 105 may not be allowed to access application 167. However, if must be completed field 260 does not indicate that the control frame 230 must be completed, authentication workflow 165 may move to an additional control frame 230 to determine whether to allow user 105 to access application 167 if user 105 fails the associated control frame 230. For example, in the illustrated embodiment, must be completed field 260 for device identification control frame 230 indicates "no." Thus, if user 105 and/or device 110 fail device identification control frame 230a, authentication workflow 165 may move to PIN identification control field 230b where user 105 inputs a PIN using user device 110. Authentication tool 145 may then determine whether to allow user 105 to access application 167, to deny user 105 access to application 167, or to request and/or require an additional input 140 from user 105 to determine whether to allow user 105 to access application 167.

Is final on pass field 265 indicates whether to allow user 105 to access application 167 once user 105 passes control frame 230. If is final on pass field 265 is set to "no," authentication workflow 165 may move to one or more additional control frames 230 before determining whether to allow user 105 to access application 167. For example, in the illustrated embodiment, is final on pass field 265a for device identification control frame 230a is set to "no." Setting is final on pass field 265a to "no" indicates that user 105 may not receive access to application 167 by providing proper input 140 to authentication tool 145 for device identification control frame 230a, alone. In this embodiment, if user 105 passes device identification 230a, authentication workflow 165 moves to one or more additional control frames 230. That is, passing a control frame 230 with is final on pass field 265 does not, alone, allow user 105 to access application 167. In some embodiments, passing a control frame 230 with an is final on pass field set to "no" provides user 105 a score, and this score, when aggregated with scores for other control frames, may allow user 105 to access application 167. If is final on pass field 265 is set to "yes," authentication tool 145 may provide user 105 access to application 167 if user 105 successfully passes a control frame 165, in some embodiments.

Modifications, additions, or omissions may be made to authentication workflow 165 without departing from the scope of the disclosure. For example, authentication workflow 165 may include some, none or all of the illustrated control frames 230. As a further example, one or more control frames 230, may include some, none, or all of the illustrated fields. Authentication workflow 165 may include additional control frames 230 and/or fields. In some embodiments, administrator 120 may specify control frames 230 and/or fields in security input 130. Additionally or alternatively, authentication tool 145 may automatically determine controls frames 230 and/or fields to include in authentication workflow 165 based on security input 130, request 135, and/or input 140.

Figure 3:
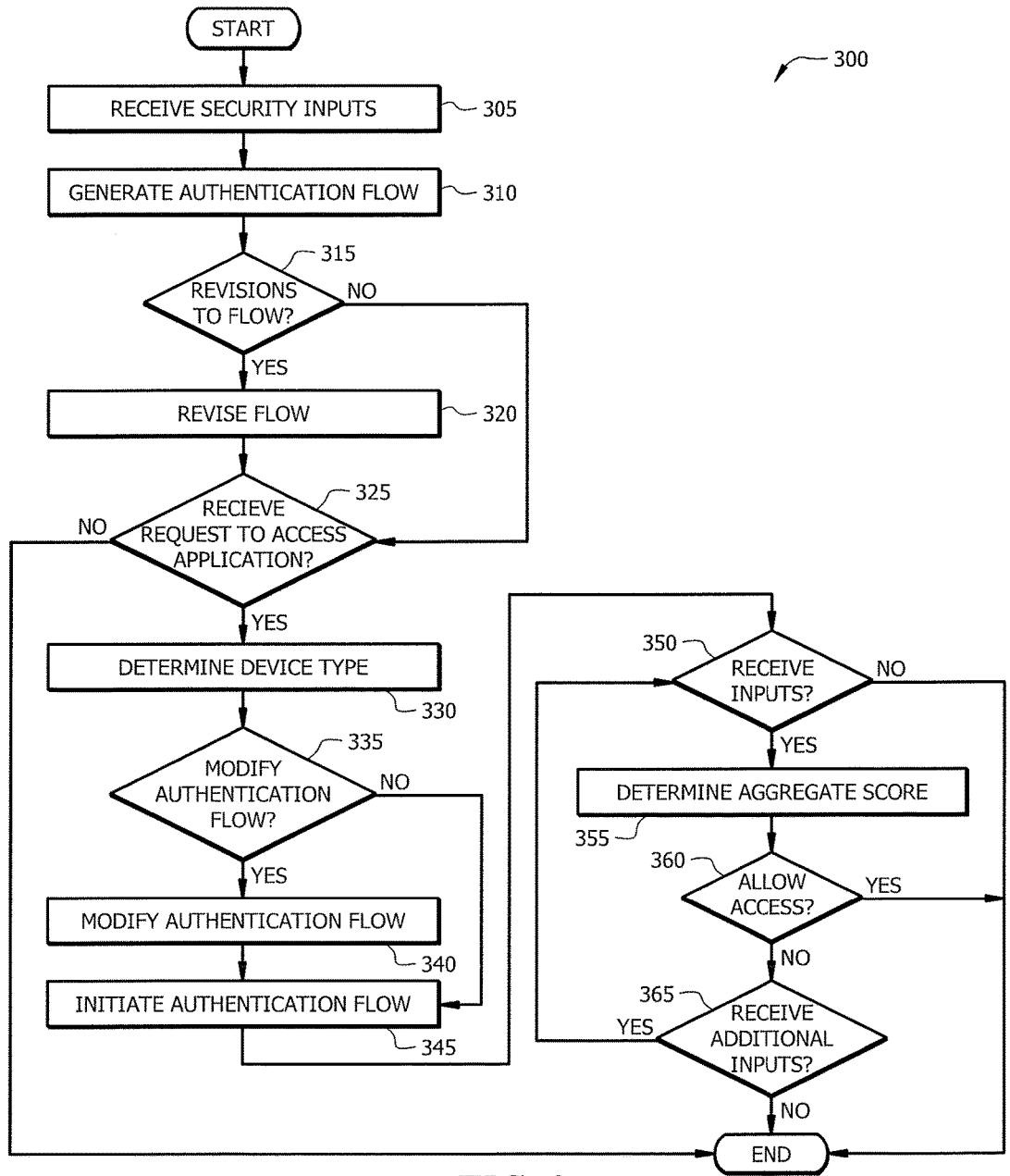
FIG. 3 is a flowchart illustrating a method for authentication workflow management using the system of FIG. 1, in certain embodiments.

FIG. 3 is a flowchart illustrating an example method 300 for workflow authentication using system 100 of FIG. 1. Method 300 begins at step 305 where authentication tool 145 receives security inputs 130. Authentication tool 145 generates authentication workflow 165 using security inputs 130. For example, security input 130 may indicate controls frames 230 to include in authentication workflow 165 and authentication tool 145 uses those control frames 230 to create authentication workflow 165. As another example, security input 130 may indicate a security level of application 167, and authentication tool 145 may generate authentication workflow 165 based on the indicated security level. For example, authentication tool 145 may utilize a template designed for the associated security level to generate authentication workflow 165. Administrator 120 may view authentication workflow 165 generated by authentication tool 145 and determine to revise authentication workflow 165. Authentication tool 145 determines whether administrator 120 requests revisions at step 315. If authentication tool 145 determines it received a request for revisions, it proceeds to step 320 whether authentication tool 145 revises authentication workflow 165 based on, for example, the revisions requested by administrator 120 using administrator device 125. Otherwise, method 300 proceeds to step 325.

Authentication tool 145 determines whether it receives request 135 to access application 167 at step 325. If authentication tool 145 does not receive request 135 at step 325, method 300 ends. Otherwise method 300 proceeds to step 330 where authentication tool 145 determines a device type of user device 110. For example, request 135 may indicate a device type of user device 110, in some embodiments. Authentication tool 145 determines whether to modify authentication flow 165 based on the indicated device type at step 335. For example, authentication tool 145 may modify authentication workflow 165 based on one or more capabilities of user device 110. For example, if authentication tool 145 determines that user device 110 has facial recognition capabilities, authentication tool 145 may insert a facial recognition control frame 230 in authentication workflow 160. If authentication tool 145 determines to modify authentication workflow 165 at step 335, authentication tool 145 modifies authentication workflow 165 at step 340. Otherwise method 300 proceeds to step 345.

Authentication tool 145 initiates authentication workflow 165 at step 345. For example, authentication tool 145 may determine a first control frame 230 and request input 140 for the first control frame 230 and/or additional control frames 230. Authentication tool 135 determines whether it receives input 140 for one or more control frames 230 at step 350. If authentication tool 145 does not receive input 140, method 300 ends. Otherwise, authentication tool 145 determines a score for one or more control frames 230 and determines an aggregate score at step 355. Authentication tool 145 determines whether to allow user 105 to access application 167 at step 360. For example, authentication tool 145 may determine whether the aggregate score exceeds a predetermined threshold. As another example, authentication tool 145 may determine whether to allow access based on whether user 105 passed and/or failed one or more control frames 230. If authentication tool 145 does not allow access at step 360, authentication tool 145 determines whether to request additional input 140 from user 105. For example, authentication tool 145 may request additional input 140 for one or more additional control frames 230 before determining whether to allow user 105 to access application 167. If authentication tool 145 determines to receive additional inputs at step 365, method 300 returns to step 350. Otherwise method 300 ends.

Modifications, additions, or omissions may be made to method 300 depicted in FIG. 3. Method 300 may include more, fewer, or other steps. While discussed as specific components completing the steps of method 300, any suitable component of system 100 may perform any step of method 300.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

The invention claimed is:

1. An authentication tool, comprising:
a memory for storing a workflow to authenticate a user to access an application, wherein the workflow comprises a first control frame for a first authentication type and a second control frame for a second authentication type, the first and second authentication types being different and comprising one of a device identification, a biometric identification, a personal identification number (PIN) identification, and a security question identification;
an interface for receiving a request to access the application;
a processor communicatively coupled to the memory and the interface for initiating the workflow in response to the request to access the application;
the interface receives a first input of the first authentication type for the first control frame and a second input of the second authentication type for the second control frame; and
the processor:
generates the workflow prior to the interface receiving the request to access the application;
determines whether to modify the workflow after receiving the request to access the application;
determines a first numerical score in response to the first input and a second numerical score in response to the second input, the first numerical score determined according to a risk level of the first input and the second numerical score determined according to a risk level of the second input;
determines an aggregate score using at least the first and second numerical scores; and
allows access to the application upon a determination that the aggregate score exceeds a predetermined threshold.

2. The authentication tool of claim 1, wherein the workflow further comprises a third control frame being different than the first control frame and the second control frame, wherein:
the interface further receives a third input of a third authentication type for the third control frame; and
the processor:
determines a third numerical score in response to the third input, the third numerical score determined according to a risk level of the third input; and
determines the aggregate score using the first, second, and third numerical scores.

3. The authentication tool of claim 1, wherein:
the interface receives an input from an administrator indicating a security level requirement for the application; and
the processor generates the workflow based on the input from the administrator.

4. The authentication tool of claim 3, wherein the predetermined threshold is determined based on the security level requirement, wherein the predetermined threshold increases when the security level requirement increases.

5. The authentication tool of claim 1, wherein the first authentication type is a PIN identification and the first control frame comprises a plurality of control frame attributes comprising:
a sample collection count indicating a number of samples to collect, wherein the sample collection count is set to one; and
a number of retries indicating a number of times to receive an input after an identification failure, wherein the number of retries is set to a number between zero and four, inclusive.

6. The authentication tool of claim 1, wherein the biometric identification includes one of a fingerprint identification, a voice identification, and a facial recognition identification.

7. The authentication tool of claim 6, wherein the first authentication type for the first control frame is a fingerprint identification and the first control frame comprises a plurality of control frame attributes comprising:
a sample collection count indicating a number of samples to collect, wherein the sample collection count is set to one;
an acceptance threshold indicating an amount of allowable difference between a predetermined fingerprint scan and a received fingerprint scan; and
a number of retries indicating a number of times to receive an input after an identification failure, wherein the number of retries is set to a number between zero and four, inclusive.

8. The authentication tool of claim 1, wherein the processor:
determines a device type for a device that communicated the request;
determines a capability of the device type; and
determines at least one of the first authentication type and the second authentication type based on the capability of the device.

9. A method, comprising:
storing a workflow to authenticate a user to access an application, wherein the workflow comprises a first control frame for a first authentication type and a second control frame for a second authentication type, the first and second authentication types being different and comprising one of a device identification, a biometric identification, a personal identification number (PIN) identification, and a security question identification;
receiving a request to access the application;
initiating the workflow in response to the request to access the application;
receiving a first input of the first authentication type for the first control frame and a second input of the second authentication type for the second control frame;
generating the workflow prior to receiving the request to access the application;
determining whether to modify the workflow after receiving the request to access the application;
determining a first numerical score in response to the first input and a second numerical score in response to the second input, the first numerical score determined according to a risk level of the first input and the second numerical score determined according to a risk level of the second input;
determining an aggregate score using at least the first and second numerical scores; and
allowing access to the application upon a determination that the aggregate score exceeds a predetermined threshold.

10. The method of claim 9, wherein the workflow further comprises a third control frame being different than the first control frame and the second control frame and the method further comprising:
receiving a third input of a third authentication type for the third control frame;

determining a third numerical score in response to the third input, the third numerical score determined according to a risk level of the third input; and determining the aggregate score using the first, second, and third numerical scores.

11. The method of claim 9, further comprising:

receiving an input from an administrator indicating a security level requirement for the application; and generating the workflow based on the input from the administrator.

12. The method of claim 11, wherein the predetermined threshold is determined based on the security level requirement, wherein the predetermined threshold increases when the security level requirement increases.

13. The method of claim 9, wherein the first authentication type is a PIN identification and the first control frame comprises a plurality of control frame attributes comprising:

a sample collection count indicating a number of samples to collect, wherein the sample collection count is set to one; and a number of retries indicating a number of times to receive an input after an identification failure, wherein the number of retries is set to a number between zero and four, inclusive.

14. The method of claim 9, wherein the biometric identification includes one of a fingerprint identification, a voice identification, and a facial recognition identification.

15. The method of claim 14, wherein the first authentication type for the first control frame is a fingerprint identification and the first control frame comprises a plurality of control frame attributes comprising:

a sample collection count indicating a number of samples to collect, wherein the sample collection count is set to one;

an acceptance threshold indicating an amount of allowable difference between a predetermined fingerprint scan and a received fingerprint scan; and a number of retries indicating a number of times to receive an input after an identification failure, wherein the number of retries is set to a number between zero and four, inclusive.

16. The method of claim 9, further comprising:

determining a device type for a device that communicated the request;

determining a capability of the device type; and determining at least one of the first authentication type and the second authentication type based on the capability of the device.

17. A non-transitory computer-readable medium comprising software, the software when executed by one or more processing units operable to:

store a workflow to authenticate a user to access an application, wherein the workflow comprises a first control frame for a first authentication type and a second control frame for a second authentication type, the first and second authentication types being different and comprising one of a device identification, a biometric identification, a personal identification number (PIN) identification, and a security question identification;

receive a request to access the application;

initiate the workflow in response to the request to access the application;

receive a first input of the first authentication type for the first control frame and a second input of the second authentication type for the second control frame;

generate the workflow prior to receiving the request to access the application;

determine whether to modify the workflow after receiving the request to access the application;

determine a first numerical score in response to the first input and a second numerical score in response to the second input, the first numerical score determined according to a risk level of the first input and the second numerical score determined according to a risk level of the second input;

determine an aggregate score using at least the first and second numerical scores; and allow access to the application upon a determination that the aggregate score exceeds a predetermined threshold.

18. The medium of claim 17, wherein the workflow further comprises a third control frame being different than the first control frame and the second control frame and the software when executed by one or more processing units is further operable to:

receive a third input of a third authentication type for the third control frame;

determine a third numerical score in response to the third input, the third numerical score determined according to a risk level of the third input; and determine the aggregate score using the first, second, and third numerical scores.

19. The medium of claim 17, wherein the software when executed by one or more processing units is further operable to:

receive an input from an administrator indicating a security level requirement for the application; and generate the workflow based on the input from the administrator.

20. The medium of claim 19, wherein the predetermined threshold is determined based on the security level requirement, wherein the predetermined threshold increases when the security level requirement increases.

* * * * *